US012458609B2

(12) United States Patent
Solt et al.

(10) Patent No.: US 12,458,609 B2
(45) Date of Patent: Nov. 4, 2025

(54) DEXTROAMPHETAMINE AND LISDEXAMFETAMINE TO REVERSE DEXMEDETOMIDINE SEDATION (71) Applicant: The General Hospital Corporation, Boston, MA (US)

(72) Inventors: Ken Solt, Lexington, MA (US); Oluwaseun Johnson-Akeju, Lexington, MA (US); Emery N. Brown, Brookline, MA (US)

(73) Assignee: The General Hospital Corporation, Boston, MA (US)

( * ) Notice: Subject to any disclaimer, the term of this patent is extended or adjusted under 35 U.S.C. 154(b) by 975 days.

(21) Appl. No.: 17/415,229

(22) PCT Filed: Dec. 19, 2019

(86) PCT No.: PCT/US2019/067591
§ 371 (c)(1),
(2) Date: Jun. 17, 2021

(87) PCT Pub. No.: WO2020/132310
PCT Pub. Date: Jun. 25, 2020

(65) Prior Publication Data
US 2022/0062206 A1 Mar. 3, 2022

Related U.S. Application Data (60) Provisional application No. 62/782,097, filed on Dec. 19, 2018.

(51) Int. Cl.
*A61K 31/165* (2006.01)
*A61K 9/00* (2006.01)
*A61K 31/137* (2006.01)
*A61P 25/26* (2006.01)

(52) U.S. Cl.
CPC .......... *A61K 31/165* (2013.01); *A61K 9/0019* (2013.01); *A61K 31/137* (2013.01); *A61P 25/26* (2018.01)

(58) Field of Classification Search
None
See application file for complete search history.

(56) References Cited

U.S. PATENT DOCUMENTS

| | | | |
|---|---|---|---|
| 2,507,631 A | 5/1950 | Panizzon et al. |
| 2,957,880 A | 10/1960 | Rudolf |
| 4,522,811 A | 6/1985 | Eppstein et al. |
| 5,192,527 A | 3/1993 | Abrahmsohn |
| 5,908,850 A | 6/1999 | Zeitlin et al. |
| 6,025,362 A | 2/2000 | Fukunaga et al. |
| 6,281,242 B1 | 8/2001 | Regan et al. |
| 6,872,390 B2 | 3/2005 | Weber et al. |
| 7,164,025 B2 | 1/2007 | Langston et al. |
| 2004/0143021 A1 | 7/2004 | Larijani |
| 2007/0123468 A1 | 5/2007 | Jenkins |
| 2009/0076023 A1 | 3/2009 | Weber et al. |
| 2009/0131338 A1 | 5/2009 | Satou et al. |
| 2011/0021564 A1 | 1/2011 | Sanfilippo |
| 2011/0262442 A1 | 10/2011 | Hamilton et al. |
| 2015/0196249 A1 | 7/2015 | Brown et al. |
| 2016/0022659 A1 | 1/2016 | Winston |
| 2017/0231556 A1* | 8/2017 | Purdon ............ A61B 5/4821 600/544 |
| 2020/0029892 A1 | 1/2020 | Brown et al. |
| 2022/0104759 A1 | 4/2022 | Brown et al. |

FOREIGN PATENT DOCUMENTS

| | | |
|---|---|---|
| WO | WO 2000/059479 | 10/2000 |
| WO | WO 2012/031125 | 3/2012 |

OTHER PUBLICATIONS

Fiszman et al. (Gen. Pharmac. vol. 20, No. 3, pp. 351-358, 1989).*
Alkire et al., "Consciousness and Anesthesia," Science, Nov. 2008, 322(5903):876-880.
Alkire et al., "Thalamic Microinjection of Nicotine Reverses Sevoflurane-induced Loss of Righting Reflex in the Rat," Anesthesiology, Aug. 2007, 107:264-272.
Antognini et al., "Propofol, more than halothane, depresses electroencephalographic activation resulting from electrical stimulation in reticular formation," Acta Anaesthesiol Scand, 2006, 50(8):993-998.
Chemali et al., "Active Emergence from Propofol General Anesthesia Is Induced by Methylphenidate," Anesthesiology, May 2012, 116: 998-1005.
Chemali et al., "Methylphenidate actively induces emergence from propofol general anesthesia," Presentation Abstract, Neuroscience, 2011, 2 pages.
Chidambaran et al., "Evaluation of propofol anesthesia in morbidly obese children and adolescents," BMC Anesthesiology, 2013, 13:8, 9 pages.
Ching et al., "Thalamocortical model for a propofol-induced α-rhythm associated with loss of consciousness," PNAS, Dec. 2010, 107(52):22665-22670.
Diaz and Kaye, "Death by Propofol," J La State Med Soc, 2017, 169: 28-32, 2 pages (Abstract Only).
Dodson et al., "Postoperative Effects of Methylphenidate," British Journal of Anaesthesia, 1980, 52(12):1265-1270.
Eckenhoff, "Promiscuous Ligand and Attractive Cavities: How do the inhaled anesthetics work?," Molecular Interventions, Dec. 2001, 1(5): 258-268.
Eger II, "Age, Minimum Alveolar Anesthetic Concentration, and Minimum Alveolar Anesthetic Concentration-Awake," Anesth Analg, 2001, 93(4): 947-53.

(Continued)

Primary Examiner — Bong-Sook Baek
(74) Attorney, Agent, or Firm — Fish & Richardson P.C.

(57) ABSTRACT

Methods and compositions, e.g., compositions for intravenous administration, comprising dextroamphetamine and/or lisdexamfetamine for use in reversal of dexmedetomidine sedation.

19 Claims, 4 Drawing Sheets

(56) References Cited

OTHER PUBLICATIONS

European Patent Office Extended European Search Report, Application No. 12781958.9, Sep. 15, 2014, 11 pages.
Extended European Search Report in European Appln. No. 19899707.4, dated Aug. 10, 2022, 9 pages.
Fasting and Gisvold, "Serious intraoperative problems—a five-year review of 83,844 anesthetics," Can J Anesth, 2002, 49: 545-553.
Ferguson et al., "Methylphenidate (Ritalin) hydrochloride parenteral solution: preliminary report," Journal of the American Medical Association, 1956, 162(14):1303-1304, 3 pages (Abstract only).
Franks, "General anaesthesia: from molecular targets to neuronal pathways of sleep and arousal," Nat. Rev. Neurosci., 2008, 9:370-386.
Grasshoff et al., "Molecular and systemic mechanisms of general anaesthesia: the 'multi-site and multiple mechanisms' concept," Current Opinion in Anaesthesiology, 2005, 18(4):386-391.
Hahn et al., "A Direct Dynamic Dose-Response Model of Propofol for Individualized Anesthesia Care," IEEE Transactions on Biomedical Engineering, 2012, 59(2):571-578.
Han et al., "Deaths from recreational use of propofol in Korea," Forensic Science International, 2013, 233: 333-337.
Heal et al., "The neuropharmacology of ADHD drugs in vivo: Insights on efficacy and safety," Neuropharmacology, Dec. 2009, 57:608-18.
Horner et al., "Methylphenidate and atomoxetine increase histamine release in rat prefrontal cortex," Eur. J. Pharmacol, Mar. 2007, 558(1-3):96-97.
Hudetz et al., "Cholinergic reversal of isoflurane anesthesia in rats as measured by cross-approximate entropy of the electroencephalogram," Anesthesiology, 2003, 99:1125-1131.
International Preliminary Report on Patentability in International Appln. No. PCT/US2019/067591, mailed on Jul. 1, 2021, 9 pages.
International Search Report and Written Opinion in International Appln. No. PCT/US2019/067591, mailed on Feb. 28, 2020, 17 pages.
Jasinski and Krishnan, "Human pharmacology of intravenous lisdexamfetamine dimesylate: abuse liability in adult stimulant abusers," Journal of Pharmacology, 2009, 23(4):410-418.
John et al., "Invariant Reversible QEEG Effects of Anesthetics," Consciousness and Cognition, 2001, 10:165-183.
Jurd et al., "General anesthetic actions in vivo strongly attenuated by a point mutation in the GABAA receptor B3 subunit," FASEB J, 2003, 17(2):250-2.
Kato et al., "D-Amphetamine Rapidly Reverses Dexmedetomidine-Induced Unconsciousness in Rats," Front Pharmacol., May 18, 2021, 12:668285, 10 pages.
Katsuga et al., "General anesthesia for two patients taking methylphenidate (Ritalin)," Masui, 2008, 57:748-751 (with English abstract).
Kelz et al., "An essential role for orexins in emergence from general anesthesia," PNAS, 2008, 105:1309-1314.
Kenny et al., "Dextroamphetamine (but Not Atomoxetine) Induces Reanimation from General Anesthesia: Implications for the Roles of Dopamine and Norepinephrine in Active Emergence," PLoS One, Jul. 2015, 10(7):e0131914, 16 pages.
Klausz et al., "Evaluation of a fatal propofol intoxication due to self administration," Journal of Forensic and Legal Medicine, 2009, 16: 287-289.
Kranioti et al, "Lethal self administration of propofol (Diprivan) A case report and review of the literature," Forensic Science International, 2007, 167: 56-58.

Letter from the Department of Health & Human Services—Food and Drug Administration, dated Aug. 11, 2010, 12 pages.
Liley et al., "Propofol and Remifentanil Differentially Modulate Frontal Electroencephalographic Activity," Anesthesiology, Aug. 2010, 113(2):292-304.
Luo et al., "Basal forebrain histaminergic transmission modulates electroencephalographic activity and emergence from isoflurane anesthesia," Anesthesiology, 2009, 111:725-733.
Maier et al., "Todesfalle durch Propofolmissbrauch. Befragung in rechtsmedizinischen Instituten in Deutschland, Osterreich und der Schweiz," Anaesthesist, 2017, 66: 109-114 (with English abstract—p. 111).
Michel et al., "Acute amphetamine abuse problems during general anaesthesia for neurosurgery," Anaesthesia, 1979, 1016-1019.
Monroe et al., "The Misuse and Abuse of Propofol," Substance Abuse & Misuse, 2011, 46: 1199-1205.
Naaz and Ozair, "Dexmedetomidine in Current Anaesthesia Practice—A Review," J Clin Diagn Res., Oct. 2014, 8(10):GE01-GE04.
Nelson et al., "The α2-Adrenoceptor Agonist Dexmedetomidine Converges on an Endogenous Sleep-promoting Pathway to Exert Its Sedative Effects," Anesthesiology, Feb. 2003, 98(2):428-436.
PCT International Preliminary Report on Patentability in International Appln. No. PCT/US2011/050213, dated Mar. 5, 2013, 7 pages.
PCT International Search Report and Written Opinion in International Appln. No. PCT/US2011/050213, dated May 1, 2012, 10 pages.
Purdon et al., "Simultaneous Electroencephalography and Functional Magnetic Resonance Imaging of General Anesthesia," Ann. N.Y. Aced. Sci., 2009, 1157:61-70.
Ririe et al., "Unexpected interaction of methylphenidate (Ritalin) with anaesthetic agents," Paediatr. Anaesth., 1997, 7:69-72.
Saper et al., "Hypothalamic regulation of sleep and circadian rhythms," Nature, Oct. 2005, 437:1257-1263.
Saraghi et al., "Propofol: An Overview of Its Risks and Benefits," Compendium, Apr. 2013, 34:252-258.
Scheinin et al., "Reversal of the sedative and sympatholytic effects of Dexmedetomidine with a specific [alpha]2-Adrenoceptor antagonist atipamezole: a pharmacodynamic and kinetic study in healthy volunteers," Anesthesiology, Sep. 1998, 89:574-584.
Solt and Forman, "Correlating the clinical actions and molecular mechanisms of general anesthetics," Curr Opin Anaesthesiol, 2007, 20:300-306.
Solt et al., "Methylphenidate, but not physostigmine, restores righting in rats during isoflurane hypnosis," Proceedings of the 2010 Annual Meeting of the American Society Anesthesiologists, Oct. 2010, 2 pages.
Taylor et al., "Activation of D1 dopamine receptors restores the righting reflex during continuous isoflurane anesthesia," Presentation Abstract, Neuroscience, Nov. 2011, 2 pages.
Vuyk et al. "Chapter 30: Intravenous Anesthetics." In Miller's Anesthesia, 8$^{th}$ Ed., Saunders, 2015, 822-832.
Wilson et al., "The abuse potential of propofol," Clinical Toxicology, 2010, 48: 165-170.
Van Dort et al., "Adenosine $A_1$ and $A_{2A}$ Receptors in Mouse Prefrontal Cortex Modulate Acetylcholine Release and Behavioral Arousal," Journal Of Neuroscience, Jan. 2009, 29(3):871-881.
Van Dort, "Regulation of Arousal by Adenosine $A_1$ and $A_{2A}$ Receptors in the Prefrontal Cortex of C57BL/6J Mouse," Thesis for the degree of Doctor of Philosophy, University of Michigan, Molecular and Integrative Physiology, 2008, 150 pages.
Lepeltier et al., "Dexmedetomidine sedation vs. inhaled general anesthesia for pediatric MRI: a retrospective cohort study," Archives de Pédiatrie, Apr. 2022, 29(3):213-218.

\* cited by examiner

DEXTROAMPHETAMINE AND LISDEXAMFETAMINE TO REVERSE DEXMEDETOMIDINE SEDATION

CLAIM OF PRIORITY

This application is a § 371 National Stage Application of PCT/US2019/067591, filed Dec. 19, 2019, which claims the benefit of U.S. Patent Application Ser. No. 62/782,097, filed on Dec. 19, 2018. The entire contents of the foregoing are hereby incorporated by reference.

TECHNICAL FIELD

Described herein are methods and compositions, e.g., compositions for intravenous administration, comprising dextroamphetamine and/or lisdexamfetamine for use in reversal of dexmedetomidine sedation.

BACKGROUND

Dexmedetomidine is a highly selective alpha2 adrenoceptor (α2-AR) agonist that produces dose-dependent sedation as well as having anxiolytic and analgesic effects without inducing respiratory depression. See, e.g., Naaz and Ozair, J Clin Diagn Res. 2014 October; 8(10): GE01-GE04. It is useful perioperatively, providing cooperative or semi-arousable sedation, and in intensive care, providing light to moderate sedation that is similar to natural sleep. Dexmedetomidine induces sedation by reducing activity of noradrenergic neurons in the brainstem, thereby increasing the activity of sleep-promoting inhibitory gamma-aminobutyric acid (GABA)-ergic neurons in the anterior hypothalamus and basal forebrain (see, e.g., Nelson et al., Anesthesiology. 98 (2): 428-436 (2003)). In addition to its use in humans, dexmedetomidine is widely used in veterinary medicine.

SUMMARY

Dexmedetomidine (DEX) is a sedative drug that is widely used in operating rooms and intensive care units. However, its long half-life and potential for significant side effects limits its use. Thus, a reversal agent that would allow caregivers to accelerate recovery from sedation would be useful. As shown herein, administration of dopaminergic stimulants, e.g., dextroamphetamine, significantly reduces time to recovery of consciousness and is expected to reduce time to recovery from the side effects, e.g., reduce time to reversal of bradycardia and recovery of hypotension.

Thus provided herein are pharmaceutical compositions comprising dextroamphetamine, or a pharmaceutically acceptable salt thereof, and lisdexamfetamine, or a pharmaceutically acceptable salt thereof. In some embodiments, the composition further comprises one or more pharmaceutically acceptable excipients. In some embodiments, the active agents consist of dextroamphetamine, or a pharmaceutically acceptable salt thereof, and lisdexamfetamine, or a pharmaceutically acceptable salt thereof.

In some embodiments, the pharmaceutical composition is a liquid formulation. In some embodiments, the pharmaceutical composition is lyophilized. In some embodiments, the composition is formulated for parenteral, e.g., intravenous or intramuscular, administration. In some embodiments, the dextroamphetamine and lisdextroamfetamine are present in a ratio of at least 1:1 up to 1:20, preferably 1:2 to 1:20, 1:5 to 1:20, or 1:8 to 1:12 w/w. In some embodiments, the compositions comprise a dose of dextroamphetamine that is less than 3 mg/kg, between 0.2 to 2.9 mg/kg, e.g., 0.5-2.5 mg/kg.

Also provided herein are methods for reversing dexmedotomidine sedation or facilitating emergence from dexmedotomidine sedation in a subject. The methods include administering (e.g., intravenously or intramuscularly) to a subject in need thereof an effective amount of a pharmaceutical composition comprising dextroamphetamine, or a pharmaceutically acceptable salt thereof lisdexamfetamine, or a pharmaceutically acceptable salt thereof or a combination thereof. In some embodiments, the dextroamphetamine and lisdextroamfetamine are administered (in separate compositions or in a single composition) in a ratio of at least 1:1 up to 1:20, preferably 1:2 to 1:20, 1:5 to 1:20, or 1:8 to 1:12 w/w. In some embodiments, the methods include administering a dose of dextroamphetamine that is less than 3 mg/kg, between 0.2 to 2.9 mg/kg, e.g., 0.5-2.5 mg/kg.

Also provided herein are pharmaceutical compositions comprising dextroamphetamine, or a pharmaceutically acceptable salt thereof lisdexamfetamine, or a pharmaceutically acceptable salt thereof; or a combination thereof, for use in reversing dexmedotomidine sedation or facilitating emergence from dexmedotomidine sedation in a subject. In some embodiments, the dextroamphetamine and lisdextroamfetamine are (in separate compositions or in a single composition) in a ratio of at least 1:1 up to 1:20, preferably 1:2 to 1:20, 1:5 to 1:20, or 1:8 to 1:12 w/w. In some embodiments, the dose of dextroamphetamine is less than 3 mg/kg, between 0.2 to 2.9 mg/kg, e.g., 0.5-2.5 mg/kg In some embodiments, the reversal of dexmedetomidine sedation comprises one or more of increased mobility in the subject; restoration of a low-amplitude, high-frequency awake pattern on an electroencephalogram; increased consciousness in the subject; reversal of bradycardia; or recovery from hypotension, e.g., return to normotension.

In some embodiments, the subject has been, but is no longer being, administered dexmedotomidine. For example, the subject has been administered a sufficient dose of dexmedotomidine to result in sedation. In some embodiments, the subject is experiencing a side effect of dexmedotomidine sedation as known in the art or described herein.

In some embodiments, the subject is administered the pharmaceutical composition comprising dextroamphetamine, or a pharmaceutically acceptable salt thereof, lisdexamfetamine, or a pharmaceutically acceptable salt thereof, or a combination thereof, immediately prior to, or immediately subsequent to, cessation of the administration of dexmedotomidine. In some embodiments, the pharmaceutical composition comprises dextroamphetamine, or a pharmaceutically acceptable salt thereof. In some embodiments, dextroamphetamine, or a pharmaceutically acceptable salt thereof, is the only active agent in the composition. In some embodiments, the pharmaceutical composition comprises lisdexamfetamine, or a pharmaceutically acceptable salt thereof. In some embodiments, lisdexamfetamine, or a pharmaceutically acceptable salt thereof, is the only active agent in the composition. In some embodiments, the pharmaceutical composition comprises dextroamphetamine, or a pharmaceutically acceptable salt thereof, and lisdexamfetamine, or a pharmaceutically acceptable salt thereof. In some embodiments, dextroamphetamine, or a pharmaceutically acceptable salt thereof, and lisdexamfetamine, or a pharmaceutically acceptable salt thereof, are the only active agents in the composition.

In some embodiments, the composition further comprises one or more pharmaceutically acceptable excipients.

In some embodiments of the methods and uses described herein, the subject is a mammal, e.g., a human or veterinary subject.

Unless otherwise defined, all technical and scientific terms used herein have the same meaning as commonly understood by one of ordinary skill in the art to which this invention belongs. Methods and materials are described herein for use in the present invention; other, suitable methods and materials known in the art can also be used. The materials, methods, and examples are illustrative only and not intended to be limiting. All publications, patent applications, patents, sequences, database entries, and other references mentioned herein are incorporated by reference in their entirety. In case of conflict, the present specification, including definitions, will control.

Other features and advantages of the invention will be apparent from the following detailed description and figures, and from the claims.

DETAILED DESCRIPTION

Dexmedetomidine (DEX) is a sedative drug that is widely used in operating rooms and intensive care units. Unlike general anesthetics such as propofol, sevoflurane and ketamine that produce a deep state of unresponsiveness sufficient to perform major surgery, DEX at clinically recommended doses produces a state similar to natural sleep, where patients can wake up with sufficient stimulation. This property is useful when patients need to be sedated but still arousable, such as during certain types of brain surgery, or while intubated in the ICU. DEX produces sedation by binding to alpha 2A adrenergic receptors in the brain, which is distinct from the molecular mechanisms of general anesthetics, which target GABA receptors (e.g. propofol and barbiturates), NMDA receptors (e.g. ketamine and nitrous oxide) or both (e.g. isoflurane and sevoflurane).

DEX has a long half-life of approximately 2 hours in humans. It causes prolonged sedation, rendering the drug unsuitable for outpatient procedures. Also, DEX is commonly administered to achieve sedation during "awake" brain surgeries. However, due to its long half-life, arousing patients from DEX sedation to enable sustained performance of motor and language tasks that are essential for guiding surgical resection while preserving vital brain function (i.e., language comprehension) remains a challenge. In addition, DEX commonly produces two significant side effects: low heart rate and low blood pressure (hypotension), as well as others including nausea, dry mouth, irregular heartbeat, fever, vomiting, low blood plasma, fluid buildup between lungs and chest, agitation, anemia, fast heart rate, chills, high blood sugar (hyperglycemia), low blood oxygen, extremely elevated body temperature (hyperthermia), complete or partial collapse of a lung, post-procedure bleeding, low blood calcium, decreased urination, wheezing, swelling of the extremities, acid accumulation in the body, or fluid in the lungs.

Figure 1:
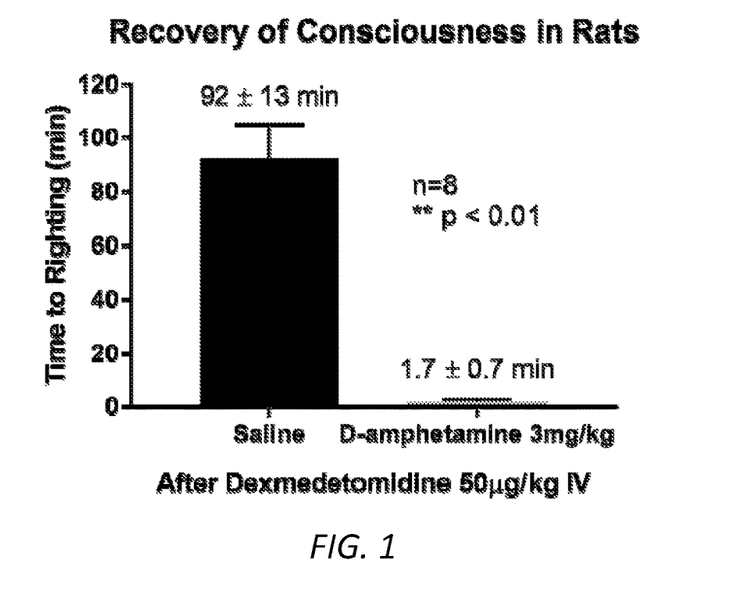
FIG. 1 is a bar graph showing that dextroamphetamine rapidly restores consciousness in rats sedated with DEX.
Figure 2:
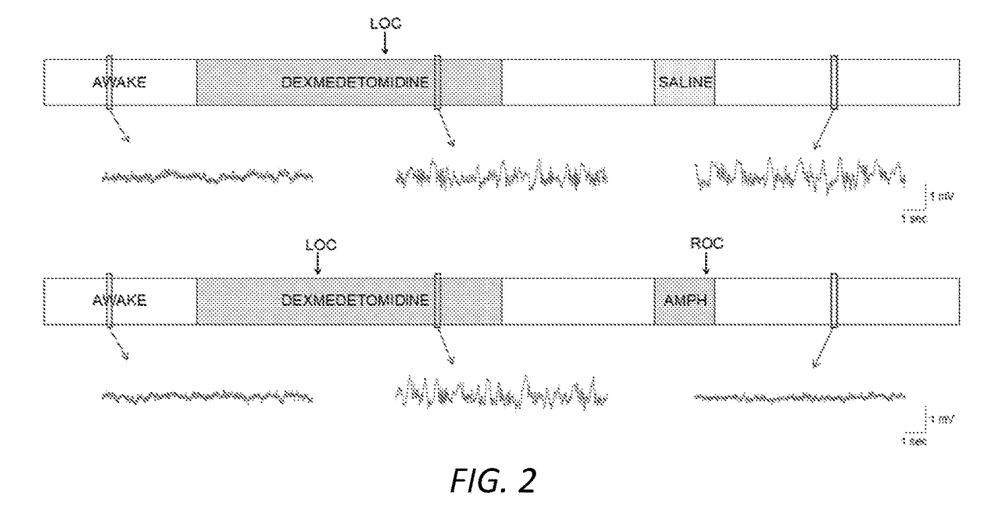
FIG. 2 is a graph showing that dextroamphetamine rapidly restores awake brain activity in rats sedated with DEX.
Figure 3:
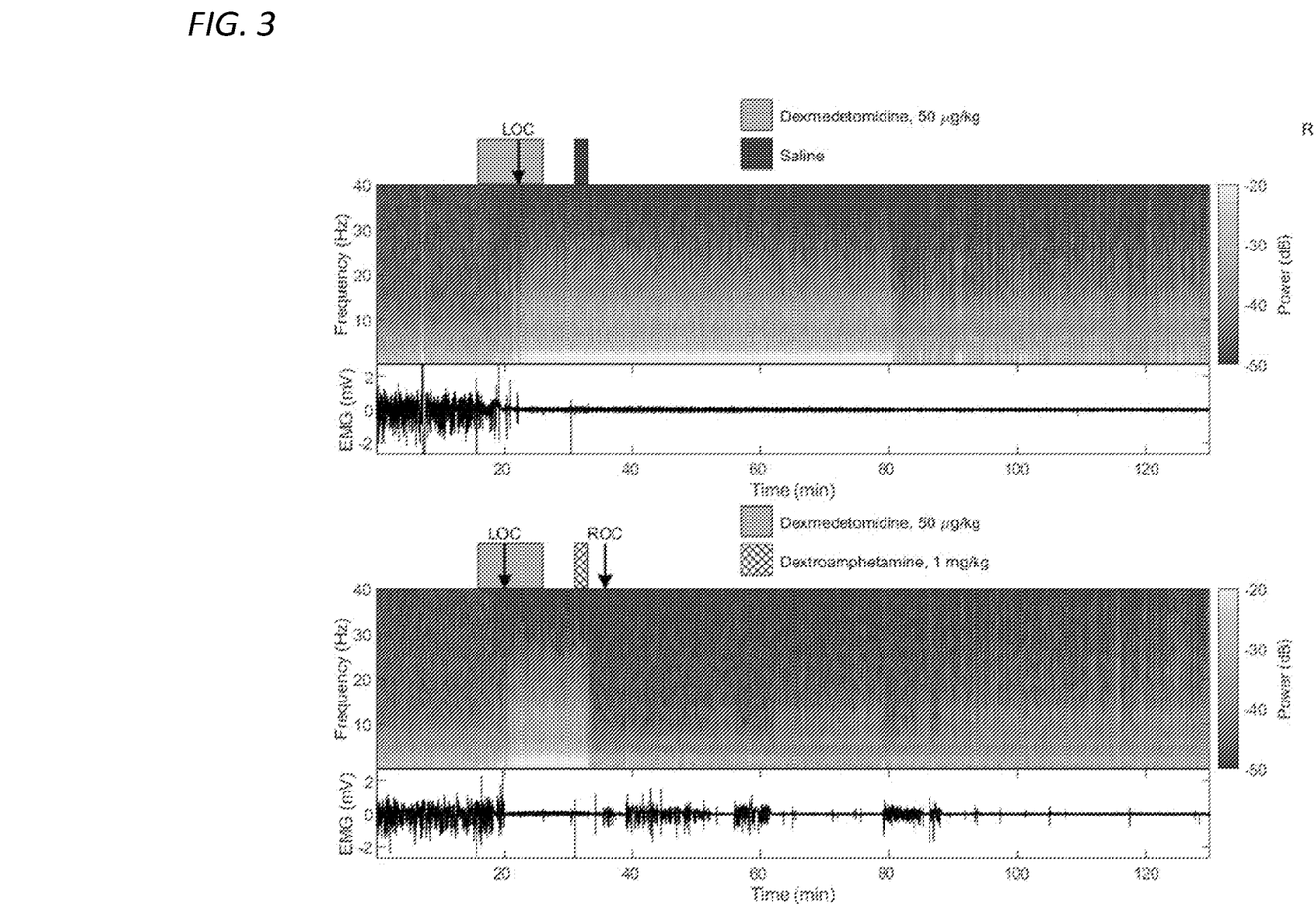
FIG. 3 is a graph showing the results of analysis of brain and muscle activity, demonstrating that dextroamphetamine rapidly restored and sustained consciousness in rats sedated with DEX.

A reversal agent that rapidly restores wakefulness in patients sedated with DEX would be highly desirable, especially if it also restores normal heart rate and blood pressure. In our laboratory, we recently discovered that intravenous dextroamphetamine (commonly prescribed in oral form as ADDERALL) rapidly restores consciousness in rats sedated with DEX (FIG. 1). We also found that dextroamphetamine restores an awake pattern of electrical brain activity (FIGS. 2 and 3). Because dextroamphetamine is known to increase heart rate and blood pressure, it would be an ideal reversal agent for DEX. Our invention is the use of intravenous dextroamphetamine for the specific indication of reversing DEX sedation.

Figure 4:
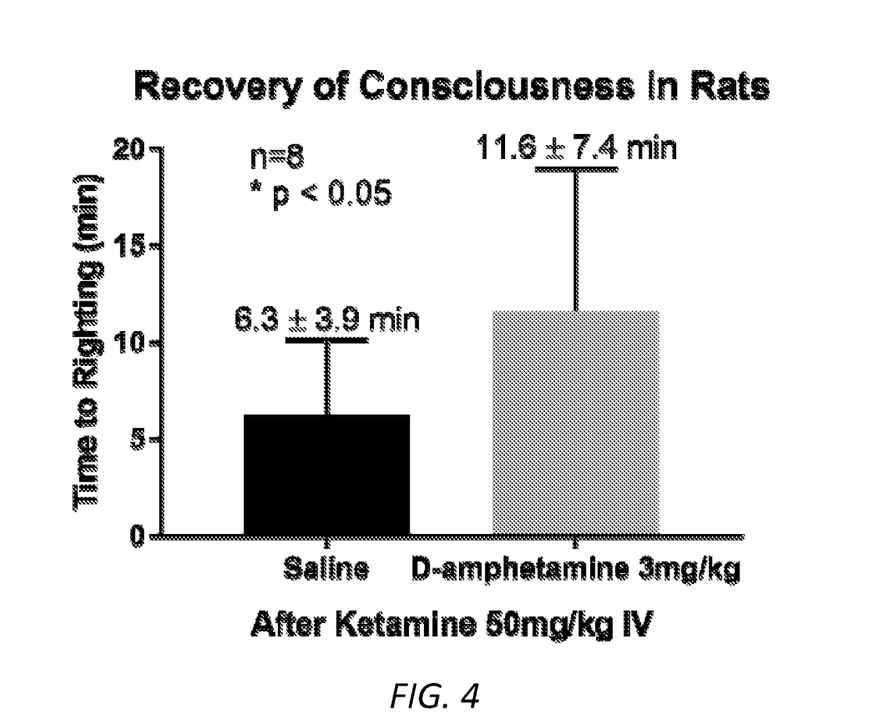
FIG. 4 is a bar graph showing that dextroamphetamine prolongs ketamine anesthesia.

To our knowledge, the reversal of DEX with dextroamphetamine has not been previously reported. Dextroamphetamine has been shown to reverse propofol and sevoflurane anesthesia in rats (see, e.g., Kenny et al., PLoS ONE 10(7): e0131914 (2015)). However, reversal of DEX by dextroamphetamine is not an obvious extension of this finding. First, DEX is defined as a sedative, not a general anesthetic. While it is useful for procedural sedation, the drug is fundamentally different from general anesthetics in that DEX cannot be used as a sole agent for major surgery. Second, as described above, DEX has a distinct mechanism of action (alpha 2A receptors) compared to general anesthetics (GABA and/or NMDA receptors). We recently discovered that unlike for DEX, dextroamphetamine prolongs ketamine anesthesia in rats (FIG. 4), demonstrating that the actions of dextroamphetamine are drug-specific and cannot be considered obvious for all drugs with sedating or anesthetic properties.

Dextroamphetamine and Lisdexamfetamine

Dextroamphetamine is a dopaminergic stimulant that is commonly used to treat Attention Deficit Hyperactivity Disorder and narcolepsy. It is also used recreationally and as an enhancer of athletic and cognitive performance. As shown herein, in vivo experiments demonstrate that intravenous dextroamphetamine dramatically accelerated recovery from dexmedetomidine sedation.

Dextroamphetamine has rapid pharmacokinetics, which increases its abuse potential. Lisdexamfetamine (LDX, sold under the brand name VYVANCE among others) is an inert prodrug that is enzymatically converted to lysine and dextroamphetamine. Note that 7.4 mg/kg of LDX is enzymatically cleaved to slowly release a total of 2.2 mg/kg of d-AMPH. This conversion is rather slow, even when the drug is administered intravenously. Therefore, lisdexamfetamine is thought to have lower abuse potential than dextroamphetamine because of the slow kinetics.

Both dextroamphetamine and lisdexamfetamine are only currently available in oral form for the treatment of ADHD. We propose an intravenous formulation that contains both dextroamphetamine and lisdextroamfetamine for reversal of dexmedetomidine sedation. The combination will take advantage of the unique pharmacokinetic profiles of each drug. In order to rapidly restore wakefulness in patients that have received dexmedetomidine, the fast kinetics of dextroamphetamine will be useful to provide a large increase in dopaminergic neurotransmission. However, because the elimination of dexmedetomidine is very slow, it is possible that the patient will become re-sedated as the effects of dextroamphetamine rapidly wear off. At this point, the prodrug lisdexamfetamine will be beneficial because it is converted slowly to dextroamphetamine, providing sustained wakefulness and minimizing the possibility of re-sedation due to any lingering effects of dexmedetomidine.

The present reversal agent could be used for reversing dexmedetomidine sedation (e.g., after awake craniotomy) in mammalian subjects, e.g., in humans or veterinary subjects, e.g., in cats or dogs.

Methods of Treatment

The methods described herein include methods for the treatment of subjects who have been sedated with dexmedetomidine, to reverse the sedation or to facilitate emergence from sedation. Generally, the methods include administering an effective amount of dextroamphetamine and/or lisdextroamfetamine as described herein, to a subject who is in need of, or who has been determined to be in need of, such treatment.

As used in this context, to "treat" means to ameliorate at least one effect or side effect of sedation with dexmedetomidine. Sedation with dexmedetomidine can be associated with prolonged loss of consciousness, low heart rate and low blood pressure (hypotension), as well as others including nausea, dry mouth, irregular heartbeat, fever, vomiting, low blood plasma, fluid buildup between lungs and chest, agitation, anemia, fast heart rate, chills, high blood sugar (hyperglycemia), low blood oxygen, extremely elevated body temperature (hyperthermia), complete or partial collapse of a lung, post-procedure bleeding, low blood calcium, decreased urination, wheezing, swelling of the extremities, acid accumulation in the body, or fluid in the lungs. Administration of an effective amount of dextroamphetamine and/or lisdextroamfetamine as described herein will result in one or more of increased mobility in the subject; restoration of a low-amplitude, high-frequency awake pattern on an electroencephalogram; increased consciousness in the subject; reversal of bradycardia; or recovery from hypotension, e.g., return to normotension, and/or a reduction in any of the side effects listed above.

Pharmaceutical Compositions and Methods of Administration

The methods described herein include the use of pharmaceutical compositions comprising dextroamphetamine and/or lisdextroamfetamine as an active ingredient. In some embodiments, the compositions comprise dextroamphetamine (d-AMPH) and lisdextroamfetamine (e.g., lisdexamfetamine dimesylate) as active ingredients in a ratio of at least 1:1, e.g., up to 1:20, 1:25, 1:30, or 1:40, e.g., 1:2, 1:3, 1:4, 1:5, 1:6, 1:7, 1:8, or 1:10, up to 1:12, 1:13, 1:14, 1:15, 1:16, 1:17, 1:18, 1:19, or 1:20, with ranges possible with any of the foregoing as endpoints, e.g., 1:2 to 1:20, e.g., 1:5 to 1:20, or 1:8 to 1:12, w/w. In some embodiments, the compositions comprise a dose of dextroamphetamine that is less than 3 mg/kg, between 0.2 to 2.9 mg/kg, e.g., 0.5-2.5 mg/kg. We calculate that 3.37 mg of lisdexamfetamine dimesylate will produce 1 mg of d-AMPH after enzymatic cleavage, so 7.4 mg/kg LDX produces 2.2 mg/kg d-AMPH via cleavage of LDX (7.4/3.37=2.2).

Pharmaceutical compositions typically include a pharmaceutically acceptable carrier. As used herein the language "pharmaceutically acceptable carrier" includes saline, solvents, dispersion media, coatings, antibacterial and antifungal agents, isotonic and absorption delaying agents, and the like, compatible with pharmaceutical administration. Pharmaceutical compositions are typically formulated to be compatible with its intended route of administration. In preferred embodiments, the present compositions are formulated for intravenous or intramuscular administration.

Methods of formulating suitable pharmaceutical compositions are known in the art, see, e.g., *Remington: The Science and Practice of Pharmacy*, 21st ed., 2005; and the books in the series *Drugs and the Pharmaceutical Sciences: a Series of Textbooks and Monographs* (Dekker, NY). For example, solutions or suspensions used for parenteral, intradermal, or subcutaneous application can include the following components: a sterile diluent such as water for injection, saline solution, fixed oils, polyethylene glycols, glycerine, propylene glycol or other synthetic solvents; antibacterial agents such as benzyl alcohol or methyl parabens; antioxidants such as ascorbic acid or sodium bisulfate; chelating agents such as ethylenediaminetetraacetic acid; buffers such as acetates, citrates or phosphates and agents for the adjustment of tonicity such as sodium chloride or dextrose. pH can be adjusted with acids or bases, such as hydrochloric acid or sodium hydroxide. The parenteral preparation can be enclosed in ampules, disposable syringes or multiple dose vials made of glass or plastic.

Pharmaceutical compositions suitable for injectable use can include sterile aqueous solutions (where water soluble) or dispersions and sterile powders for the extemporaneous preparation of sterile injectable solutions or dispersion. For intravenous administration, suitable carriers include physiological saline, bacteriostatic water, Cremophor EL™ (BASF, Parsippany, NJ) or phosphate buffered saline (PBS). In all cases, the composition must be sterile and should be fluid to the extent that easy syringability exists. It should be stable under the conditions of manufacture and storage and must be preserved against the contaminating action of microorganisms such as bacteria and fungi. The carrier can be a solvent or dispersion medium containing, for example, water, ethanol, polyol (for example, glycerol, propylene glycol, and liquid polyetheylene glycol, and the like), and suitable mixtures thereof. The proper fluidity can be maintained, for example, by the use of a coating such as lecithin, by the maintenance of the required particle size in the case of dispersion and by the use of surfactants. Prevention of the action of microorganisms can be achieved by various antibacterial and antifungal agents, for example, parabens, chlorobutanol, phenol, ascorbic acid, thimerosal, and the like. In many cases, it will be preferable to include isotonic agents, for example, sugars, polyalcohols such as mannitol, sorbitol, sodium chloride in the composition. Prolonged absorption of the injectable compositions can be brought about by including in the composition an agent that delays absorption, for example, aluminum monostearate and gelatin.

Sterile injectable solutions can be prepared by incorporating the active compound in the required amount in an appropriate solvent with one or a combination of ingredients enumerated above, as required, followed by filtered sterilization. Generally, dispersions are prepared by incorporating the active compound into a sterile vehicle, which contains a basic dispersion medium and the required other ingredients from those enumerated above. In the case of sterile powders for the preparation of sterile injectable solutions, the preferred methods of preparation are vacuum drying and freeze-drying, which yield a powder of the active ingredient plus any additional desired ingredient from a previously sterile-filtered solution thereof.

In one embodiment, one or both of the therapeutic compounds are prepared with carriers that will protect the therapeutic compounds against rapid elimination from the body, such as a controlled release formulation, including implants and microencapsulated delivery systems. Biodegradable, biocompatible polymers can be used, such as ethylene vinyl acetate, polyanhydrides, polyglycolic acid, collagen, polyorthoesters, and polylactic acid. Such formulations can be prepared using standard techniques, or obtained commercially, e.g., from Alza Corporation and Nova Pharmaceuticals, Inc. Liposomal suspensions can also be used as pharmaceutically acceptable carriers. These can be prepared according to methods known to those skilled in the art, for example, as described in U.S. Pat. No. 4,522,811.

The pharmaceutical compositions can be included in a container, pack, or dispenser together with instructions for administration.

EXAMPLES

The invention is further described in the following examples, which do not limit the scope of the invention described in the claims.

Example 1: Dextroamphetamine Rapidly Restores Consciousness in Rats Sedated with DEX A randomized, blinded, crossover design was used with 8 rats. After intravenous administration of DEX (50 micrograms/kg IV) over 10 minutes, all rats became unconscious (as defined by loss of the righting reflex). 5 minutes after the DEX infusion, the animals received saline (placebo) or dextroamphetamine (3 mg/kg IV) over 2 minutes. Rats that received saline remained unconscious for a mean of 92 minutes, whereas rats that received dextroamphetamine rapidly regained consciousness in a mean of 1.7 minutes. This difference was statistically significant ($p<0.01$).

Example 2: Dextroamphetamine Rapidly Restores Awake Brain Activity in Rats Sedated with DEX Local field potentials (LFPs) were recorded from the prefrontal cortex of rats. During the awake state, the LFP shows a typical awake pattern characterized by low-amplitude, high-frequency (6-8 Hz) brain activity. During intravenous administration of DEX (50 micrograms/kg IV over 10 minutes), rats had loss of consciousness (LOC) and a characteristic sedated pattern of high-amplitude, low-frequency (<4 Hz) brain activity. After the DEX infusion, the animals received saline (placebo) or dextroamphetamine (1 mg/kg IV) over 2 minutes. As shown in FIG. 2, top panel, a rat that received saline remained unconscious with the same brain activity pattern. FIG. 2, bottom panel shows a rat that received dextroamphetamine (AMPH) had rapid recovery of consciousness (ROC) with an awake pattern of brain activity.

Example 3: Analysis of Brain and Muscle Activity Reveals that Dextroamphetamine Rapidly Restores and Sustains Consciousness in Rats Sedated with DEX Spectrograms were constructed from continuous LFP recordings from the prefrontal cortex of rats. In these figures, spectral power (dB) at a given frequency (Hz) is represented by color and plotted over time. The electromyogram (EMG) under the spectrogram shows muscle activity. The top panel of FIG. 3 shows that the DEX infusion increased low-frequency power in the LFP recording, which coincided with loss of consciousness (LOC) and disappearance of EMG activity. A saline infusion did not change LFP or EMG activity, and LOC persisted throughout the recording. As shown in the bottom panel of FIG. 3, the DEX infusion produced the same findings as above, but a subsequent infusion of dextroamphetamine rapidly decreased low-frequency LFP power, which coincided with return of consciousness (ROC) and increased EMG activity.

Example 4: Dextroamphetamine Prolongs Ketamine Anesthesia

A randomized, blinded, crossover design was used with 8 rats. After intravenous administration of ketamine (50 mg/kg IV) over 10 minutes, all rats became unconscious. 5 minutes after the ketamine infusion, the animals received saline (placebo) or dextroamphetamine (3 mg/kg IV) over 2 minutes. Rats that received saline remained unconscious for a mean of 6.3 minutes, whereas rats that received dextroamphetamine had delayed recovery of consciousness with a mean of 11.6 minutes. The difference was statistically significant ($p<0.05$). This result shows that dextroamphetamine does not reverse the effects of all drugs with sedating or anesthetic properties.

Figure 5:
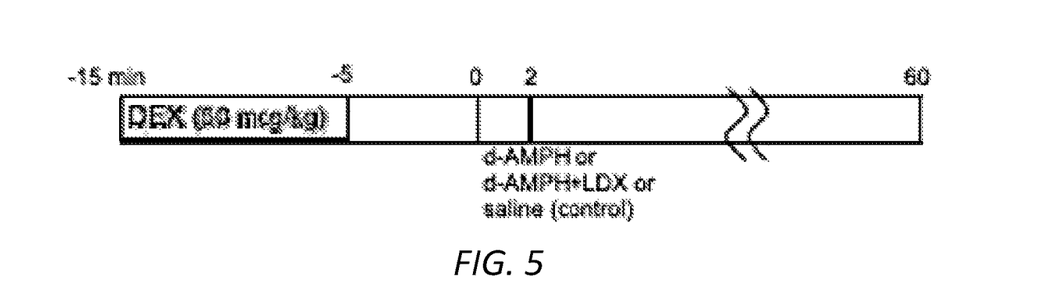
FIG. 5 is a schematic illustrating experimental design for Example 5.

Example 5. Dextroamphetamine and Lisdexamfetamine Reversal of Dexmedetomidine Sedation The data provided is from a single rat that underwent 3 experiments, with 3-4 days of rest between each session. FIG. 5 is a schematic of the experimental Design.

The rat received an intravenous infusion of dexmedetomidine (DEX, 50 mcg/kg) over 10 minutes, followed by a 5-minute rest period to switch medications. At time=0, the rat received a 2-minute IV infusion of: (1) dextroamphetamine (d-AMPH, 0.8 mg/kg), (2) a combination of d-AMPH (0.8 mg/kg) and lisdexamfetamine (LDX, 7.4 mg/kg), or (3) saline (control). Note that 7.4 mg/kg of LDX is enzymatically cleaved to slowly release a total of 2.2 mg/kg of d-AMPH.

Figure 6:
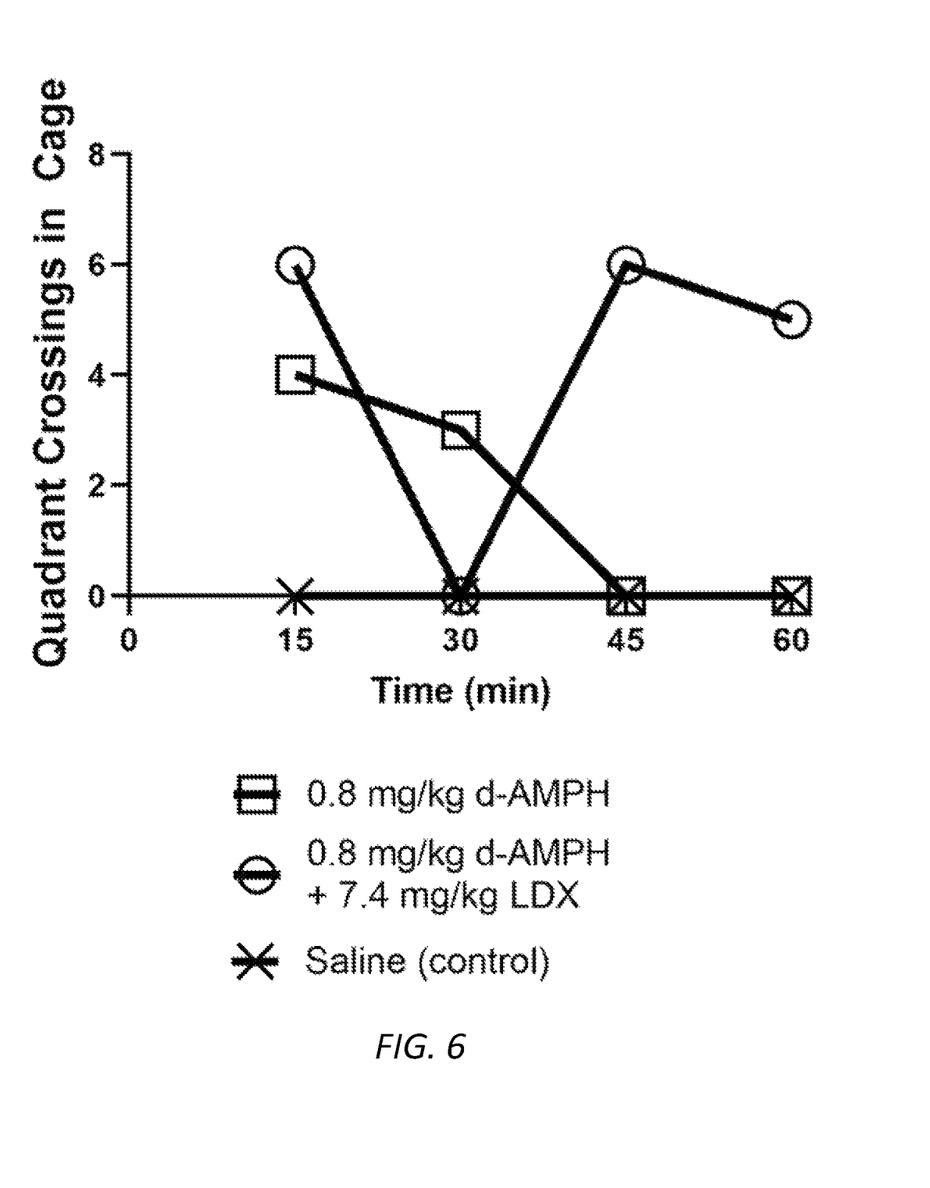
FIG. 6 is a graphs demonstrating that combining d-AMPH and LDX provided prolonged reversal of dexmedetomidine sedation.

The cage was divided into 4 quadrants, and the number of times the rat crossed from one quadrant to another was recorded. The results are shown in FIG. 6. Each data point represents the number of quadrant crossings in the cage during the preceding 15 minutes. After DEX plus saline (control), the animal remained unconscious and did not move for over 60 minutes. After DEX plus d-AMPH (0.8 mg/kg), the rat initially woke up and moved around, but after 30 minutes underwent re-sedation because the duration of action of d-AMPH is significantly shorter than DEX. However, with the addition of LDX (which is slowly converted to d-AMPH via enzymatic reaction), the animal regained consciousness after the re-sedation period, and continued to move around the cage 60 minutes later. This data shows that after DEX administration, d-AMPH alone briefly restores consciousness, and the addition of LDX provides lasting reversal of sedation. By adjusting the relative doses of d-AMPH and LDX, a combination of these two drugs provided continuous, long-lasting reversal of DEX sedation, without the adverse side effects of administering a larger dose of d-AMPH, e.g., hyperactivity and large increases in heart rate and blood pressure.

This data demonstrates that dextroamphetamine provides brief reversal of dexmedetomidine sedation, whereas the combination of dextroamphetamine and lisdexamfetamine provide long-lasting reversal.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method for reversing dexmedetomidine sedation or facilitating emergence from dexmedetomidine sedation in a subject, the method comprising administering to a subject in need thereof an effective amount of a pharmaceutical composition comprising dextroamphetamine, or a pharmaceutically acceptable salt thereof; lisdexamfetamine, or a pharmaceutically acceptable salt thereof, or a combination thereof.

2. The method of claim 1, wherein the reversal of dexmedetomidine sedation comprises one or more of increased mobility in the subject; restoration of a low-amplitude, high-frequency awake pattern on an electroencephalogram; increased consciousness in the subject; reversal of bradycardia; or recovery from hypotension.

3. The method of claim 1, wherein the subject has been, but is no longer being, administered dexmedetomidine.

4. The method of claim 1, wherein the subject is administered the pharmaceutical composition comprising dextroamphetamine, or a pharmaceutically acceptable salt thereof, lisdexamfetamine, or a pharmaceutically acceptable salt thereof, or a combination thereof, immediately prior to, or immediately subsequent to, cessation of the administration of dexmedetomidine.

5. The method of claim 1, wherein the pharmaceutical composition comprises dextroamphetamine, or a pharmaceutically acceptable salt thereof.

6. The method of claim 5, wherein dextroamphetamine, or a pharmaceutically acceptable salt thereof, is the only active agent in the composition.

7. The method of claim 1, wherein the pharmaceutical composition comprises lisdexamfetamine, or a pharmaceutically acceptable salt thereof.

8. The method of claim 7, wherein lisdexamfetamine, or a pharmaceutically acceptable salt thereof, is the only active agent in the composition.

9. The method of claim 1, wherein the pharmaceutical composition comprises dextroamphetamine, or a pharmaceutically acceptable salt thereof, and lisdexamfetamine, or a pharmaceutically acceptable salt thereof.

10. The method of claim 9, wherein dextroamphetamine, or a pharmaceutically acceptable salt thereof, and lisdexamfetamine, or a pharmaceutically acceptable salt thereof, are the only active agents in the composition.

11. The method of claim 1, wherein the composition further comprises one or more pharmaceutically acceptable excipients.

12. The method of claim 1, wherein the subject is a mammal.

13. The method of claim 12, wherein the subject is a human or veterinary subject.

14. The method of claim 1, wherein the dextroamphetamine and lisdexamfetamine are administered in a ratio of 1:2 to 1:20, 1:5 to 1:20, or 1:8 to 1:12.

15. The method of claim 1, wherein the pharmaceutical composition is administered to the subject intravenously.

16. The method of claim 2, wherein the recovery from hypotension is a return to normotension.

17. The method of claim 10, wherein the dextroamphetamine and lisdexamfetamine are present in a ratio of 1:2 to 1:20, 1:5 to 1:20, or 1:8 to 1:12.

18. The method of claim 14, wherein the dextroamphetamine is administered at a dose between 0.2 to 2.9 mg/kg.

19. The method of claim 17, wherein the dextroamphetamine is administered at a dose between 0.2 to 2.9 mg/kg.

* * * * *